(12) United States Patent
Mendo Hernandez et al.

(10) Patent No.: US 11,954,070 B2
(45) Date of Patent: Apr. 9, 2024

(54) GENERATION AND DISTRIBUTION OF TECHNICAL MODEL VIEWPOINTS

(71) Applicant: The Boeing Company, Chicago, IL (US)

(72) Inventors: Juan Carlos Mendo Hernandez, Salamanca (ES); Pieter Van Gils, Madrid (ES); Alejandro Torres Gamiz, Madrid (ES)

(73) Assignee: The Boeing Company, Arlington, VA (US)

( * ) Notice: Subject to any disclaimer, the term of this patent is extended or adjusted under 35 U.S.C. 154(b) by 216 days.

(21) Appl. No.: 17/453,709

(22) Filed: Nov. 5, 2021

(65) Prior Publication Data

US 2022/0197863 A1 Jun. 23, 2022

Related U.S. Application Data

(60) Provisional application No. 63/127,740, filed on Dec. 18, 2020.

(51) Int. Cl.
*G06F 16/14* (2019.01)
*G06F 30/10* (2020.01)
*G06F 30/20* (2020.01)

(52) U.S. Cl.
CPC ............ *G06F 16/156* (2019.01); *G06F 30/10* (2020.01); *G06F 30/20* (2020.01)

(58) Field of Classification Search
CPC ......... G06F 16/156; G06F 30/20; G06F 30/10
See application file for complete search history.

(56) References Cited

U.S. PATENT DOCUMENTS 8,996,982 B2 * 3/2015 Clemm ..................... G06F 8/10
715/229
9,372,667 B2 * 6/2016 Kossmann ............ G06F 16/367
(Continued)

OTHER PUBLICATIONS

International Council on Systems Engineering Website, Available Online at https://www.incose.org/, Available as Early as Nov. 6, 1996, 4 pages.
(Continued)

*Primary Examiner* — Huawen A Peng
(74) *Attorney, Agent, or Firm* — Alleman Hall & Tuttle LLP

(57) ABSTRACT

A method includes storing technical models in a network-accessible model repository. Each technical model is labeled with descriptive metadata and comprises one or more model views labeled with functional metadata. A request is received from a stakeholder device, the request specifying descriptive attributes and functional attributes applied to an associated stakeholder. Technical model(s) are retrieved based on the descriptive metadata labelling the retrieved technical models being determined to satisfy the descriptive attributes included in the request. For each retrieved technical model, one or more model views are compiled based on the functional metadata labelling the compiled model view being determined to satisfy the functional attributes included in the request. The stakeholder device is provided secure access to a specification package that comprises one or more viewpoints for the retrieved technical model(s), each viewpoint comprising one or more of the compiled model views for each of the retrieved technical models.

20 Claims, 8 Drawing Sheets

(56) References Cited

U.S. PATENT DOCUMENTS

| | | | | |
|---|---|---|---|---|
| 10,122,583 | B2* | 11/2018 | George | H04L 45/02 |
| 2006/0294506 | A1* | 12/2006 | Dengler | G06F 8/71 |
| | | | | 717/131 |
| 2013/0060546 | A1* | 3/2013 | Berenbach | G06F 8/10 |
| | | | | 703/6 |
| 2014/0278290 | A1* | 9/2014 | Fairbrother | G06Q 10/06375 |
| | | | | 703/2 |
| 2014/0379409 | A1* | 12/2014 | Giraldo | G06Q 10/10 |
| | | | | 705/7.22 |
| 2016/0112195 | A1* | 4/2016 | Jochheim | H04L 9/14 |
| | | | | 713/189 |
| 2016/0182323 | A1* | 6/2016 | Ferguson | H04L 43/045 |
| | | | | 709/224 |
| 2017/0098160 | A1* | 4/2017 | Chaudhuri | G06N 5/00 |
| 2017/0199645 | A1* | 7/2017 | Troy | G06F 3/04815 |
| 2019/0114148 | A1* | 4/2019 | Chakinam | G06F 11/00 |
| 2019/0213778 | A1* | 7/2019 | Du | G06T 15/04 |

OTHER PUBLICATIONS

"Meeting Charts and Notes from DEIX Forums," MBSE Wiki, Available Online at http://www.omgwiki.org/MBSE/doku.php?id=mbse:click_here_for_meeting_charts_and_notes, Available as Early as Aug. 2018, 4 pages.

"Modelling and Simulation information in a collaborative Systems Engineering Context," MoSSEC Project, Available Online at http://www.mossec.org/welcome, Available as Early as Mar. 17, 2017, 2 pages.

"About OMG," Object Management Group Website, Available Online at https://www.omg.org/about/index.htm, Available as Early as Jun. 10, 2017, 5 pages.

"OMG Systems Modeling Language (OMG SysML™)," OMC Systems Modeling Language, Sep. 2015, 346 pages.

"Digital Data Package," Prostep IVIP Website, Available Online at https://www.prostep.org/en/projects/digital-data-package-ddp/, Available as Early as Oct. 29, 2020, 3 pages.

* cited by examiner

GENERATION AND DISTRIBUTION OF TECHNICAL MODEL VIEWPOINTS

CROSS REFERENCE TO RELATED APPLICATIONS

This application claims priority to U.S. Provisional Patent Application Ser. No. 63/127,740, filed Dec. 18, 2020, the entirety of which is hereby incorporated herein by reference for all purposes.

FIELD

The subject disclosure relates generally to systems engineering and more specifically, to the parsing and secure distribution of technical data files. In some example implementations, the disclosure provides for generating and distributing custom model-based packages.

BACKGROUND

Original equipment manufacturers (OEMs) may produce integrated systems using subsystems and components supplied by multiple entities. Traditionally, a written source control drawing has been used to convey a model and specifications for such components. More modern solutions include using digital, model-based technical data to convey a cross-domain technical model and data originating from multidisciplinary environments to suppliers and other data consumers.

Current model-based solutions for data packaging and exchange merely facilitate the transfer of an established model between parties, and do not allow for different viewpoints of a model to be targeted for specific consumer backgrounds, needs, and concerns. Many portions of a model, and/or different portions of different heterogeneous models are often of interest to only a subset of end users, who do not need to wade through schema and data sets that are merely tangentially related to a particular user's task at hand.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented in this disclosure.

To address the above issues, according to one aspect of the subject disclosure, a method is provided. In this aspect, the method includes storing a plurality of technical models in a network-accessible model repository. Each technical model is labeled with descriptive metadata and comprises one or more model views labeled with functional metadata. A request is received from a stakeholder device, the request specifying descriptive attributes and functional attributes applied to an associated stakeholder. Technical model(s) are retrieved based on the descriptive metadata labelling the retrieved technical models being determined to satisfy the descriptive attributes included in the request. For each retrieved technical model, one or more model views are compiled based on the functional metadata labelling the compiled model view being determined to satisfy the functional attributes included in the request. The stakeholder device is provided secure access to a specification package that comprises one or more viewpoints for retrieved technical model(s), each viewpoint comprising one or more of the compiled model views for each of the retrieved technical models.

The features, functions, and advantages that have been discussed can be achieved independently in various embodiments or may be combined in yet other embodiments, further details of which can be seen with reference to the following description and drawings.

DETAILED DESCRIPTION

Figure 1:
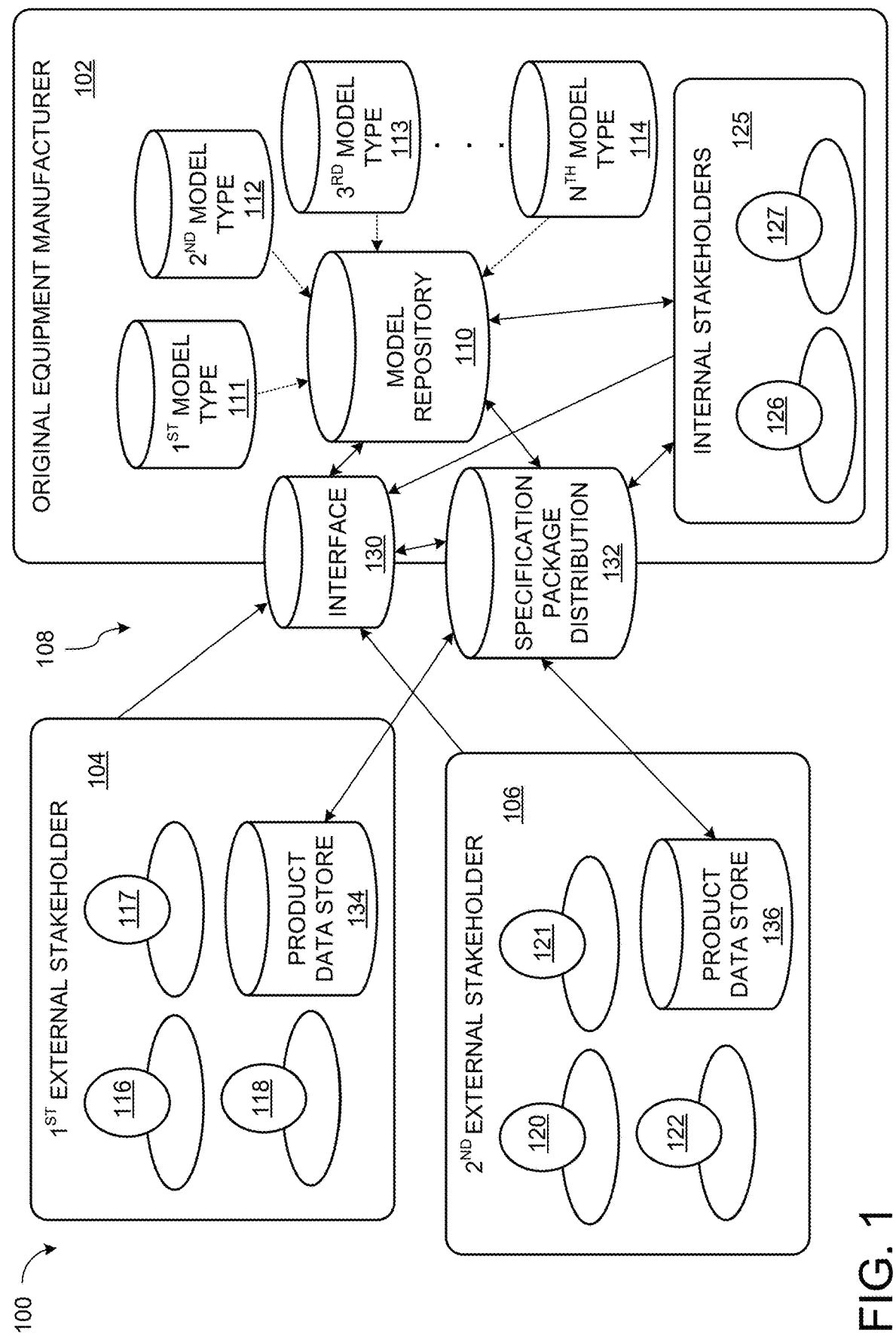
FIG. 1 schematically shows an example system for distributing and exchanging model-based packages.

Model-based engineering (MBE), or model-based systems engineering is driven by the creation and updating of domain-based technical models. These technical models are used as a means to convey information between engineering teams, using model-based packages rather than document-based bundles.

Model-based packages can thus be designed to enable suppliers, consumers, and OEMs to exchange rich, detailed information pertaining to specifications for systems, subsystems, components, etc. in a digital format. Models and relative data can originate from multiple different engineering domains and disciplines. These domains can be cataloged and stored in different development environments and storage repositories. A supplier requirements exchange service can be employed to facilitate secure transfer of models, revision and return of models, and cataloging of relevant information for all relevant parties.

End users of the model-based packages have different backgrounds, roles, and/or concerns, leading to a plurality of divergent sets of needs and demands. As such, a stakeholder may only be interested in some of the views corresponding to a subset of these models. A systems designer may know the details of the system at hand, a system architect may know the architecture of the system, and a procurement agent may be more concerned with the applicable deadlines, requirements, deliverables, etc. Not every stakeholder needs access to all potential model domains, an ever-expanding group that includes systems modeling language (SysML), model-based systems design (sysMBD), mechanical computer-aided design (mCAD), product lifecycle management (PLM), product data management (PDM), electronic computer-aided design (eCAD), computer-aided engineering (CAE), among other model domains.

Each stakeholder may prefer a viewpoint of the technical data that is tailored to their preferences and requirements. Even within a stakeholder, there may be different needs depending on the department and the roles within that department (e.g. system engineer, design engineer, structural engineer, spatial integration engineer). Each end user or team may desire a specific viewpoint related to their specific set of tasks. As an example, a systems designer may not need the CAD models for a system but may want the related behavioral models and requirements models for the system. Further, a stakeholder supplying a specific system or component may generate specifications that are a combination of multiple models.

As such, each model-based package can include different models, different views for each of the models, and different sets of digital artifacts. In some cases, a stakeholder may want or need to know more about related or neighboring systems as they get deeper into the engineering process. Additionally, each project can include multiple models, each having multiple views, and numerous related digital artifacts. As such, each end user may prefer a specific viewpoint, so that the data most relevant for that end user is readily available.

In general, it is believed there is no standard for accessing and visualizing data pulled from different engineering environments, and no method to securely package and distribute the digital artifacts and model views in order to allow model-based package consumers to smoothly implement Model-Based Engineering platforms. Such a model-based environment can also allow for movement of data and models in both directions, such that stakeholders can update model packages and return them to OEMs, for example.

Systems and methods for a collaborative infrastructure are presented herein. Project stakeholders can submit attributes including requirements and preferences via a stakeholder interface. The attributes are compared to metadata that labels technical models stored in a network-accessible model repository, and one or more technical models can then be retrieved. A set of model views can then be compiled for the retrieved technical models based on the stakeholder attributes. A specification package can then be provided to the stakeholder having viewpoints that are relevant to the end users for that stakeholder, each viewpoint including model views, model elements, model components, digital artifacts, and/or other suitable aspects. In this way, stakeholder-specific model-based packages can be provided having viewpoints tailored to the relevant end users.

FIG. 1 schematically shows an example system 100 for distributing and exchanging model-based packages. System 100 can facilitate interoperability and exchange of data between original equipment manufacturer 102 and one or more external stakeholders, such as $1^{st}$ external stakeholder 104 and $2^{nd}$ external stakeholder 106 via respective external stakeholder devices (not shown) and computer network 108 (e.g., a wired and/or wireless network).

OEM 102 can curate a network-accessible model repository 110. Model repository 110 can be located behind a firewall and/or other security level and may thus not be directly accessible to external stakeholder 104 and 106. Model repository 110 can store a plurality of technical models having a multidisciplinary nature that includes, but is not limited to, subsystem and component specifications, high level functional and logical subsystem and component descriptions, analysis models, code, verification and validation reports, 3D visualizations of component geometry, engineering bills of materials, logical bill of materials, 2-D wiring harness schematics, and/or other suitable information. Model repository 110 can be configured as a PDM repository or PDM/PLM repository, as nonlimiting examples.

In some examples, different model types can be stored in sub-repositories, depicted as $1^{st}$ model type sub-repository 111, $2^{nd}$ model type sub-repository 112, $3^{rd}$ model type sub-repository 113, and $N^{th}$ model type sub-repository 114. It should be understood that the number of sub-repositories shown is arbitrary, and that any number of sub-repositories can be used, including zero. There is no condition that excludes any one sub-repository from storing models of multiple types, however it can be advantageous in some scenarios to configure a sub-repository to specifically store data files of a particular type. Model types can include, but are not limited to: geometric models, behavioral models, analytic models, electrical models, compliance models, requirements models, functional models, design models, and/or integrated simulation models.

Each stakeholder can include one or more end users that are credentialed to access network 108 and/or product data stores (134, 136) via respective end user devices. $1^{st}$ external stakeholder 104 is shown including three end users (end user 116, end user 117, and 118), as is $2^{nd}$ external stakeholder 106 (end user 120, end user 121, end user 122). Further, OEM 102 can include internal stakeholders 125 that desire access to models stored in model repository 110. Internal stakeholders 125 are shown including end user 126 and end user 127. As described herein, external stakeholders 104 and 106 can include suppliers, consumers, partners, testing facilities, and/or other parties contracted to participate in the manufacturing and compliance process for OEM 102. End users can include individuals, teams, departments, etc. within the stakeholder.

As described further herein, each stakeholder, and potentially each end user, may have a different set of requirements, needs, and attributes that can inform which of the models are pertinent to their specific tasks and designated aspects of any particular project. External stakeholders 104 and 106 can submit credentials, requirements, job specifications, and/or requests for the stakeholder and any pertinent end users using a stakeholder associated device via stakeholder interface 130, which optionally can store such stakeholder data. Stakeholder interface 130 can also store such information for internal stakeholders 125 and any pertinent internal end users, though this information may be submitted by another party within OEM 102. Stakeholder attributes will be discussed further herein and with regard to FIG. 2, and can include at least a project identifier and one or more preferred model types.

Based on the stakeholder request and related attributes accessed by the stakeholder interface 130, specification package distribution 132 can retrieve one or more technical models from model repository 110, bundle the technical model(s) into a specification package and distribute the specification package to the relevant stakeholders via computer network 108. Stakeholder interface 130 and specification package distribution 132 can be configured to grant secure access to curated information in model repository 110 based on established security requirements and stakeholder credentials. Stakeholder and end user-specific credentials can be confirmed using any suitable credential enforcement scheme, and access to data can be regulated and enforced using encryption/decryption credentials, read/write access control, or other secure regulation schemes positioned to protect model repository 110.

External stakeholders 104 and 106 can store the distributed specification package within a product data store, such as product data stores 134 and 136, respectively. As per model repository 110, product data stores 134 and 136 can be configured as PDM repositories, PLM repositories, PDM/PLM repositories, etc. according to the needs of the stakeholder, as well as the requirements of OEM 102. For example, product data stores 134 and 136 can be configured to enforce security credential access to the distributed specification packages as dictated by OEM 102. In some examples, the stakeholders can update, amend, or alter one or more of the models via a stakeholder-associated device, such as updating a component specification based on real-world data, replacing a range or requirement distribution for a theoretical component. As such, the stakeholder can upload the updated model or models to specification package distribution 132 via a stakeholder-associated device. Specification package distribution 132 can place the updated models in model repository 110.

Figure 2:
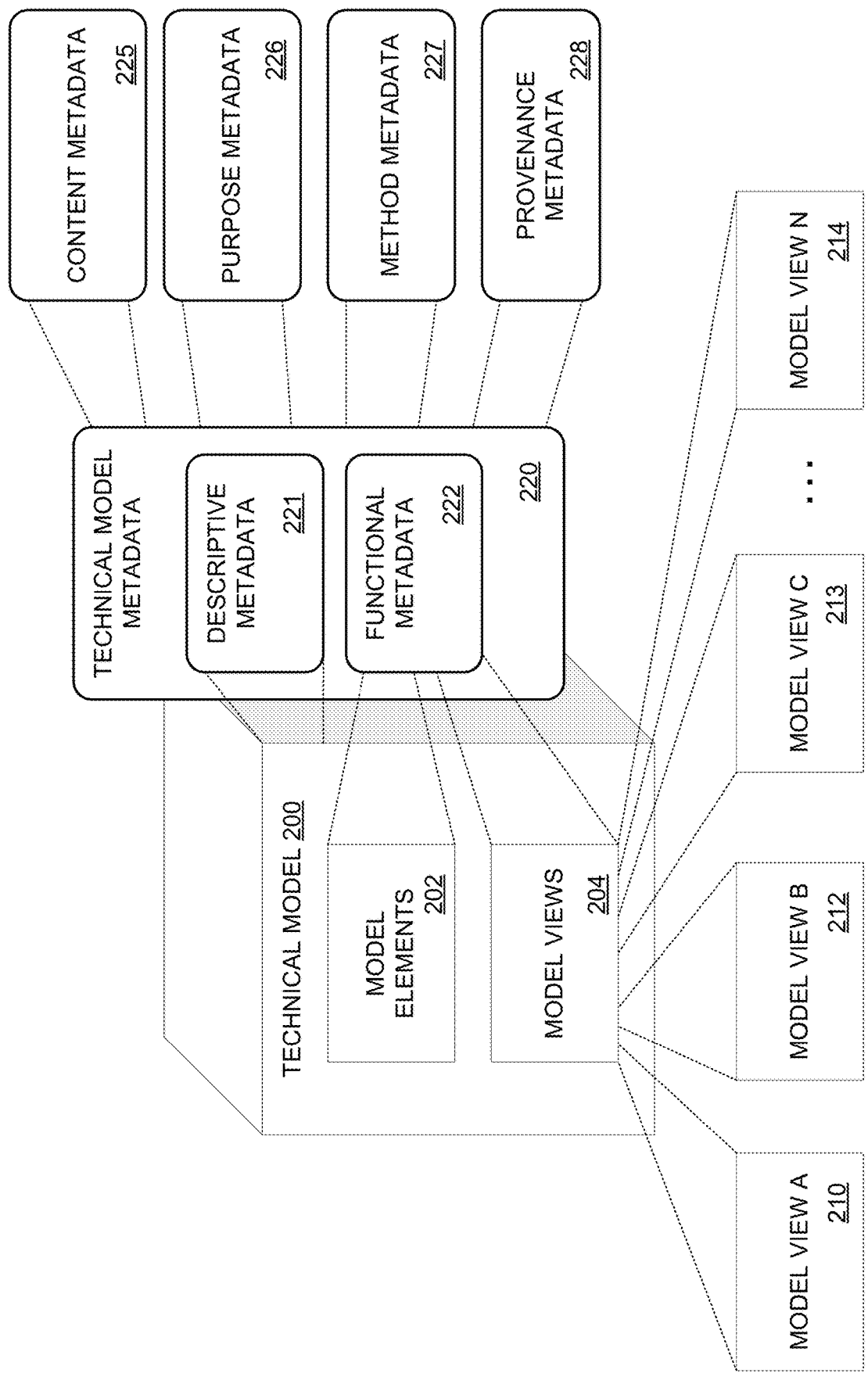
FIG. 2 schematically shows a diagram of a technical model including a plurality of model views and associated metadata.

FIG. 2 schematically shows a diagram of an example technical model 200. Technical model 200 includes a plurality of model elements 202 and model views 204. Model elements 202 can include components, subcomponents, parts, and/or other digital artifacts pertaining to technical model 200. Model views 204 can include data and representations pertaining to technical model 200 and/or one or more model elements 202.

As shown in FIG. 2, a plurality of model views (e.g., model view A 210, model view B 212, model view C 213, model view N 214) can be included for technical model 200. Each model view 204 can include a perspective, data set, representation, or other view of technical model 200. For example, a behavioral model of a mass-spring-damper system can include a behavioral view, a code view, an electrical view, a graphics view, a diagrammatic view, a simulation view, a descriptive view, etc. Each model view 204 can include specialized information that is presented in a way that is useful for an end user working on a specific aspect of technical model 200.

Technical model 200 can be labeled with a set of technical model metadata 220. For the purposes of this disclosure, metadata that pertains to the overall technical model 200 will be referred to as descriptive metadata 221, and metadata that pertains to one or more specific model elements and/or model views will be referred to as functional metadata 222.

In some examples, technical model 200 is labeled with technical model metadata 220 at the time technical model 200 is authored. For example, the authoring software, domain application, application plug-in and/or model designer(s) can apply metadata automatically or can prompt a user executing the authoring to add technical model metadata 220. In some examples, technical model metadata 220 can be added at a later time point, for example by a user, automatically by a model repository, data exchange server, product data management system, product lifecycle management system, etc. In some examples, the metadata can be field-labeled to increase the efficacy of searching.

Technical model metadata 220 can be packaged in the form of a model manifest attached to technical model 200. The model manifest can be configured to be viewed, edited, exposed, etc., by a plurality of authoring tools, analysis domain applications, and management software, either deliberately by a user or automatically as captured and/or extracted.

In some examples, descriptive metadata 221 and functional metadata 222 can include some overlapping data. Both descriptive metadata and functional metadata can include multiple metadata types. As examples, technical model metadata 220 is shown including content metadata 225, purpose metadata 226, method metadata 227, and provenance metadata 228. Content metadata 225 can include information pertaining to what is included in technical model 200, such as what the technical model represents, the model type, model format, etc. Purpose metadata 226 can include information pertaining to the intent of technical model 200, such as why the model was created, what projects the technical model pertains to, etc. Method metadata 227 can include information pertaining to how technical model 200 was created, such as authoring software, preceding versions of the model, etc. Provenance metadata 228 can include information pertaining to who created technical model 200, when technical model 200 was created, etc.

Figure 3:
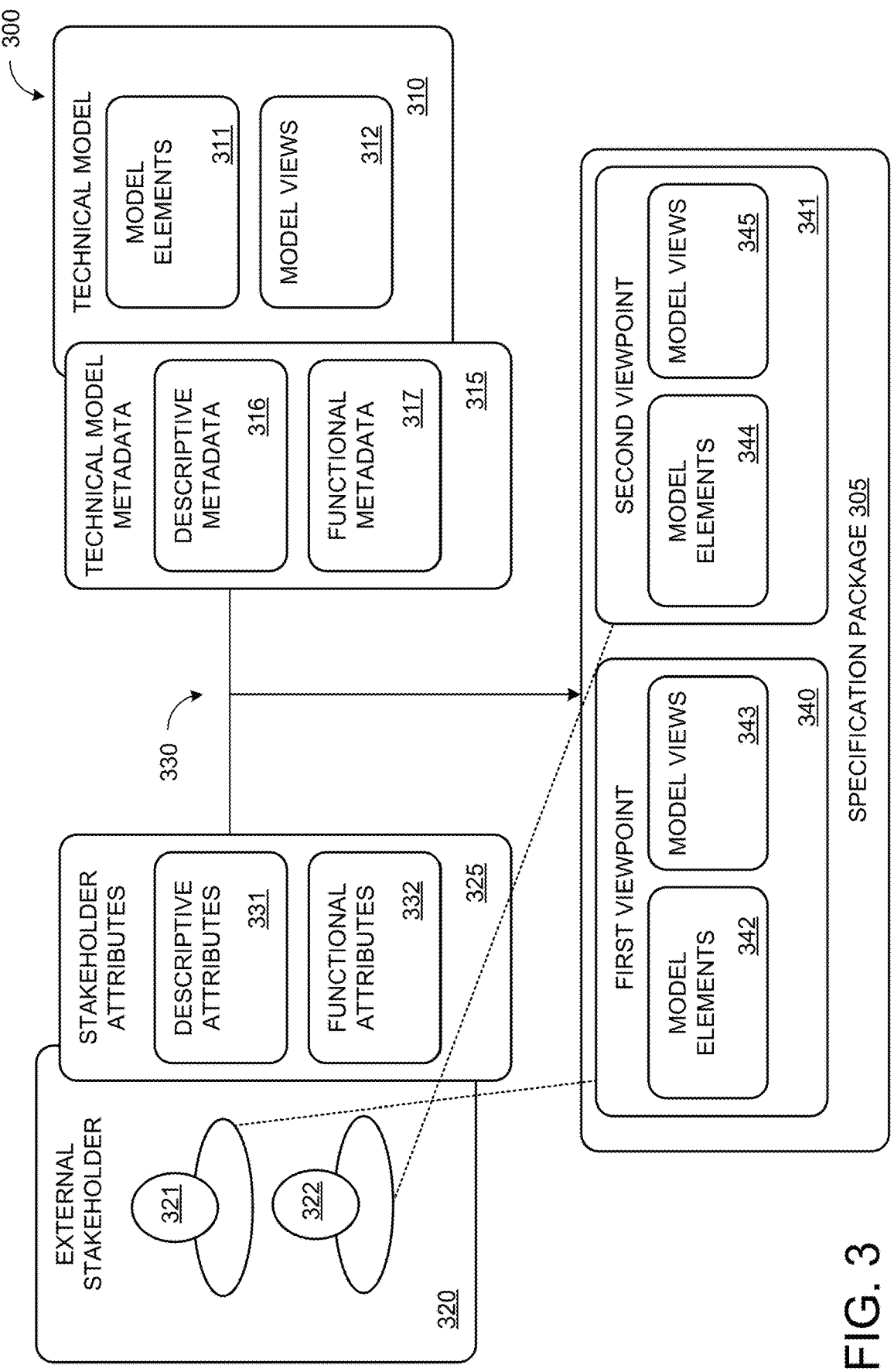
FIG. 3 schematically shows an example system for generating a specification package including one or more model views.

FIG. 3 schematically shows an example system 300 for generating a specification package 305 including one or more model views. Each specification package 305 can be based on one or more technical models 310. As described with regard to FIG. 2, each technical model 310 can include a plurality of model elements 311 and a plurality of model views 312. Technical model 310 can be labeled with technical model metadata 315, which can include both descriptive metadata 316 and functional metadata 317. Specification package 305 can be compiled for a stakeholder, such as external stakeholder 320, based on the identity of stakeholder 320 (e.g., via any requirements enumerated for the stakeholder). As described with regard to FIG. 1, stakeholder attributes 325 can be submitted via a stakeholder interface (e.g., stakeholder interface 130) which can for example, read a user profile that enumerates the stakeholder requirements. External stakeholder 320 can include a plurality of end users, such as end users 321 and 322. The enumerated stakeholder requirements can include requirements specific to each end user.

Specification packages, views, and viewpoints can represent fundamental bundles of technical data that can be shared and exchanged between entities, and may be particularly relevant when exchanging data with entities that did not participate in the development of the digital artifacts from which these fundamental bundles are comprised, such as external stakeholder 320.

External stakeholder 320 can submit one or more stakeholder attributes 325 via a stakeholder-associated device as part of a request 330 for a specification package 305. Stakeholder attributes 325 can include descriptive attributes 331 and/or functional attributes 332. In some examples, stakeholder attributes 325 can mirror or otherwise be formatted to correspond to technical model metadata 315. For example, a form, template, or other suitable compatible schema can be provided by the OEM receiving requests from external stakeholder 320 via a stakeholder-associated device. Such a schema can provide fillable fields corresponding to technical model metadata categories, and/or can be configured to extract data from a stakeholder profile via a stakeholder profile management system. Descriptive attributes 331 can correspond to descriptive metadata 316, while functional attributes 332 can correspond to functional metadata 317. In some examples, descriptive attributes 331 can be derived from parameters for external stakeholder 320, while functional attributes can be derived from parameters specific to end users 321 and 322.

As such, a comparison of stakeholder attributes 325 and technical model metadata 315 can be used to determine the contents of specification package 305. A comparison of descriptive attributes 331 and descriptive metadata 316 can be used to determine which technical models 310 are selected for inclusion in specification package 305. In this way, the selected models 310 can be matched to the stakeholder, domain, purpose, project, etc. A comparison of functional attributes 332 and functional metadata 317 can be used to determine which model elements 311 and model views 312 for each technical model 310 are included in specification package. In this way, the selected model elements 311 and model views 312 can be matched to the end user language, format, method, presentation, etc. As will be described further herein with regard to FIGS. 4A, 4B, and 5, one or more technical models can be included in each specification package. For each selected technical model, one or more model elements and one or more model views can be selected for inclusion in specification package 305.

Specification package 305 can include one or more viewpoints, such as first viewpoint 340 and second viewpoint 341. First and second viewpoints 340 and 341 can include model views 312 derived from technical models 310 of two or more specific model types. For simplicity, first and second viewpoints 340 and 341 will be described as being derived from a single technical model 310. First viewpoint 340 includes one or more model elements 342 and one or more model views 343. Each viewpoint can be considered to include a stakeholder-specific subset of model elements and views, and in this example, the viewpoints include end user-specific subsets of model elements and views. First viewpoint 340 can be compiled based on functional attributes 332 associated with end user 321 (dotted line). Second viewpoint 341 includes one or more model elements 344 and one or more model views 345. Second viewpoint 341 can be compiled based on functional attributes 332 associated with end user 322 (dotted line). As used herein, "compile" and its derivatives refer to the process of grouping together technical data that is retrieved from an existing data store and/or generated on demand.

As first and second viewpoints 340 and 341 are targeted to different end users, model elements 342 and 344 can include different subsets of model elements 311. Similarly, model views 343 and 345 can include different subsets of model views 312. However, some model elements and/or model views can be common between first viewpoint 340 and second viewpoint 341. In this way, end users 321 and 322 can be presented with a viewpoint that meets their specific needs, as described in functional attributes 332. Each viewpoint can thus include a different plurality of model diagrams, model screenshots, tables, model queries, webpages, text, or other data visualizations, digital artifacts, etc.

For OEMs with a significant number of stakeholders, both internal and external, myriad combinations of technical models, model artifacts, and viewpoints can be compiled into specification packages tailored based on the requirements of the stakeholders and their end users. As such, the OEM can employ more specialized systems and subsystems to parse stakeholder attributes, map those attributes against technical model metadata, parse end user attributes, map those attributes against model view metadata, and generate and securely distribute specification packages including those viewpoints.

Figure 4A:
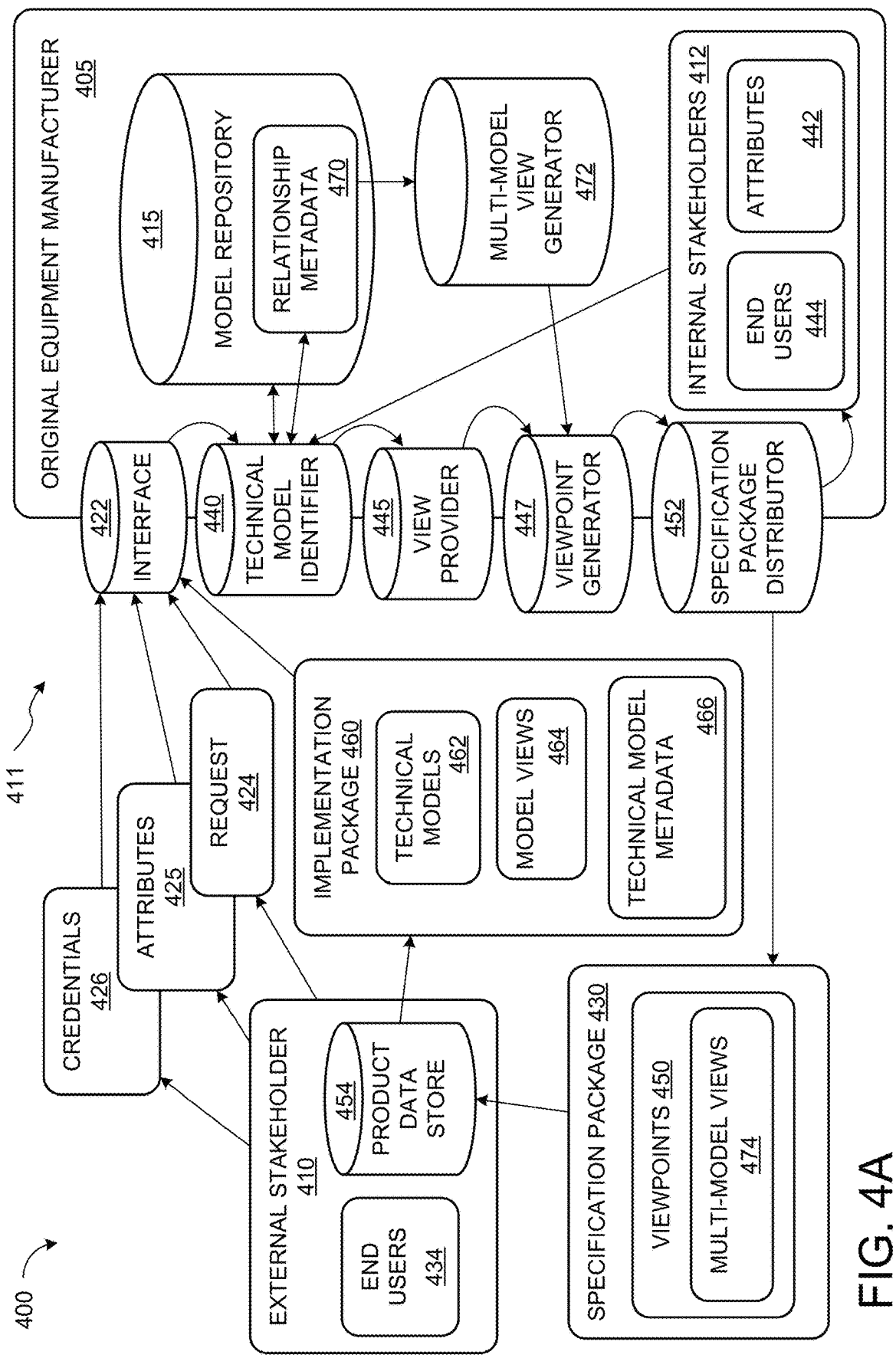
FIG. 4A schematically shows an example system for generating and securely distributing viewpoints for a technical model.

FIG. 4A schematically shows an example system 400 for generating and securely distributing viewpoints for a technical model. System 400 serves as a collaborative infrastructure by which an OEM 405 and one or more stakeholders can exchange technical models, model artifacts, and viewpoints via stakeholder-associated devices. Based on attributes of the stakeholders and metadata associated with the technical models, viewpoints including digital artifacts from one or more technical models can be automatically compiled, packaged, and distributed. Such a system can be used bi-directionally, where either the external stakeholder 410, via a stakeholder-associated device, or the OEM 405 provides the model-based package via computer network 411, and can also be used internally, for example to generate specific viewpoints tailored for internal stakeholders 412.

OEM 405 can include a secure, network-accessible model repository 415 configured to store a plurality of technical models, each technical model labeled with descriptive metadata, and each technical model including one or more model views labeled with functional metadata. Network-accessible model repository 415 can additionally include two or more sub-repositories, each sub-repository configured to store technical models of a specific model type. OEM 405 can include a plurality of internal stakeholders 412, each internal stakeholder having a plurality of end users 417 and attributes 420, as described with regard to FIG. 1.

System 400 can include a stakeholder interface 422 configured to receive a stakeholder request 424 via computer network 411. Stakeholder request 424 can include a plurality of attributes 425, which can include a plurality of descriptive attributes and functional attributes specific to stakeholder 410, the descriptive attributes and functional attributes corresponding to the descriptive metadata and functional metadata labeling the technical models stored in model repository 415. In some examples, a request template can be provided, matching attribute fields to metadata fields.

Stakeholder request 424 can additionally or alternatively include one or more stakeholder credentials 426. Stakeholder credentials can be used to decrypt encrypted specification packages 430, enable interaction with stakeholder interface 422, etc. For example, stakeholder interface 422 can securely regulate access based on established security requirements and stakeholder credentials. Each stakeholder can only have clearance or permission to consume certain models, model views, digital artifacts, etc.

As described with regard to FIG. 1, external stakeholder 410 can include a plurality of end users 434. As described with regard to FIG. 3, functional attributes specific to each end user can be included in attributes 425. Although in some examples, attributes 425 and credentials 426 are submitted along with stakeholder request 424, attributes 425 and credentials 426 for previously known external stakeholders 410 can be stored at stakeholder interface 422. Stakeholder credentials 426 can indicate or be used to determine which end users 434, and/or end user roles have permission to view specific digital artifacts.

A technical model identifier 440 can be configured to receive attributes 425 (e.g., descriptive attributes, functional attributes) from stakeholder interface 422, and to map the descriptive attributes against the descriptive metadata labelling technical models stored in model repository 415. Technical model identifier 440 can then retrieve one or more technical models from the secure, network-accessible model repository 415 based on the descriptive metadata labelling the technical model satisfying the descriptive attributes included in the stakeholder request 424.

Technical model identifier 440 can receive attributes 442 directly from internal stakeholders 412 via stakeholder-associated devices and/or via stakeholder interface 422. Attributes 442 can include descriptive attributes related to internal stakeholder 412 as well as functional attributes related to end users 444. Descriptive attributes can be mapped against descriptive metadata, and technical models retrieved from model repository 415.

View provider 445 can be configured to, for each technical model retrieved by technical model identifier 440, compile one or more model views based on the functional metadata labelling the compiled model view satisfying the functional attributes included in the stakeholder request 424, or satisfying the functional attributes included in internal stakeholder attributes 442.

Viewpoint generator 447 can be configured to compile one or more viewpoints 450 for one or more retrieved technical models, each viewpoint 450 including one or more of the collected model views for each of the retrieved technical models.

Specification package distributor 452 can be configured to provide external stakeholder 410 secure access, via a stakeholder-associated device connected to computer network 411, to a specification package 430 including one or more viewpoints 450. Each specification package 430 can be compiled at viewpoint generator 447 and/or at specification package distributor 452, and can include one or more models, model views, model components, and other digital artifacts in addition to the one or more viewpoints. A device associated with external stakeholder 410 can store specification package 430 in product data store 454. Specification package distributor 452 can also provide viewpoints and specification packages for consumption by internal stakeholders 412 via stakeholder-associated devices. Such digital files can be stored internally at OEM 405, such as at model repository 415 or another suitable storage repository.

In some examples, external stakeholder 410 can provide an implementation package 460 to OEM 405 via a stakeholder-associated device. An implementation package can be created de novo by external stakeholder 410, or can be based on an existing specification package 430. Each implementation package can include one or more technical models 462, one or more model views 464, and a plurality of technical model metadata 466. As per specification package 430, each implementation package 460 can include one or more viewpoints, model components and subcomponents, and other digital artifacts. Implementation package 460 can include model data based on updated specifications for a model, such as testing data for a manufactured component. Such specifications can augment or update theoretical and/or specification ranges provided in specification package 430. Implementation package 460 can be delivered to OEM 405 over computer network 411 via stakeholder interface 422 (as shown), specification package distributor 452, and/or via a dedicated portal.

Model repository 415 can store relationship metadata 470, describing relationships between various models. For example, relationship metadata 470 can be included in model manifests, and/or in a dedicated data store. As will be described further with regards to FIG. 6, relationship metadata 470 can be consumed by multi-model view generator 472 to determine multi-model views 474 based on technical models and views selected for a particular specification package. Multi-model views 474 can be included within viewpoints 450, and can include a plurality of links and link types indicating models that are at least somewhat related to a primary model or set of models. Viewpoint generator 447 can package multi-model views into one or more viewpoints 450.

In some examples, technical model identifier 440 can only be able to map the descriptive and/or functional attributes to a subset of the model metadata by performing a direct search of model repository 415. Technical model identifier 440 can also consume relationship metadata 470 in order to facilitate the task of finding applicable technical models that can be relevant to a specific stakeholder. For example, technical model identifier 440 can infer relevant models by traversing metadata labels and metadata links between different models that are included in relationship metadata 470. One or more technical models can thus be retrieved in part based on relationship metadata 470. In this way, all the technical models stored in model repository 415 that are applicable to the stakeholder can be collected (e.g. a specifications model linked to a behavior model can be relevant for the system designer end user).

Figure 4B:
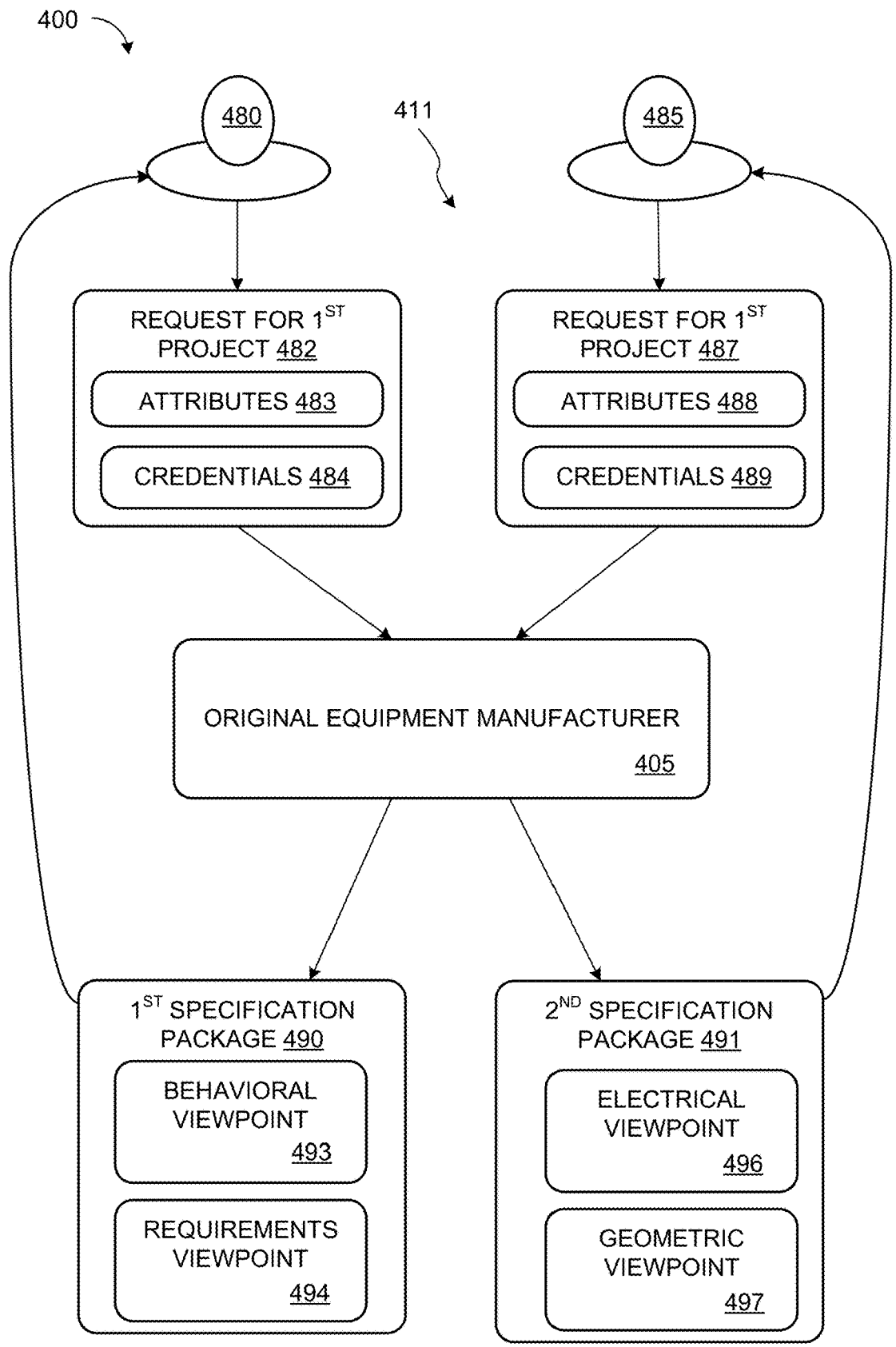
FIG. 4B schematically shows an example implementation of the system of FIG. 4A.

FIG. 4B shows an example implementation of system 400, wherein multiple end users having different sets of attributes and credentials submit a request for the same project. A first end user 480 submits a request 482 via an end user-associated device for a first project to OEM 405 (e.g., via stakeholder interface 422). Request 482 can include attributes 483 and credentials 484 that are specific for first end user 480. In some examples, at least some of attributes 483 and/or credentials 484 can be retrieved from a data store upon receipt of request 482. A second end user 485 submits a request 487 via an end user-associated device to OEM 405 for the same first project requested by first end user 480. For example, first end user 480 and second end user can both be requesting access to technical models associated with a mass-spring-damper system. Request 487 can include attributes 488 and credentials 489 that are specific for second end user 485. In some examples, at least some of attributes 488 and/or credentials 489 can be retrieved from a data store upon receipt of request 487.

First end user 480 and second end user 485 can be included in the same stakeholder or different stakeholders, either external or internal. In scenarios where first end user 480 and second end user 485 are included in the same stakeholder, attributes 483 and 488, and credentials 484 and 489 can be included in the same request.

Once requests 482 and 487 are submitted, models can be retrieved, and views and viewpoints compiled as described with regard to FIG. 4A. Although the requests 482 and 487 can be for the same project, the descriptive attributes for first end user 480 and second end user 485 can map to different subsets of models, though some or all of the models can overlap. Compiled model views can be different for first end user 480 and second end user 485, even if one or more of the same technical models were retrieved for each end user.

Viewpoints can then be compiled including one or more viewpoints for each end user based on the retrieved models and compiled model views. OEM 405 can then compile specification packages specific to each external stakeholder (e.g., via specification package distributor 452. OEM 405 can then compile and expose first specification package 490 and second specification package 491 to first end user 480 and second end user 485, respectively, via end user-associated devices. In this example, first specification package 490 includes a behavioral viewpoint 493 and a requirements viewpoint 494, while second specification package 491 includes an electrical viewpoint 496 and a geometric viewpoint 497.

First specification package 490 and second specification package 491 can include overlapping sets of data. However, despite requesting the same project, system 400 ensures that each end user is provided a custom-tailored specification package based on the attributes and credentials of the end users. The model view subsets included in each viewpoint can overlap, and multi-model views can be included in each specification package that link data included in the first specification package 490 to data included in the second specification package 491. In an example, the first specification package 490 can be accessed by the first end user 480 via a first end user-associated device and the second specification package 491 can be accessed by the second end user 485 via a second end user-associated device.

Figure 5:
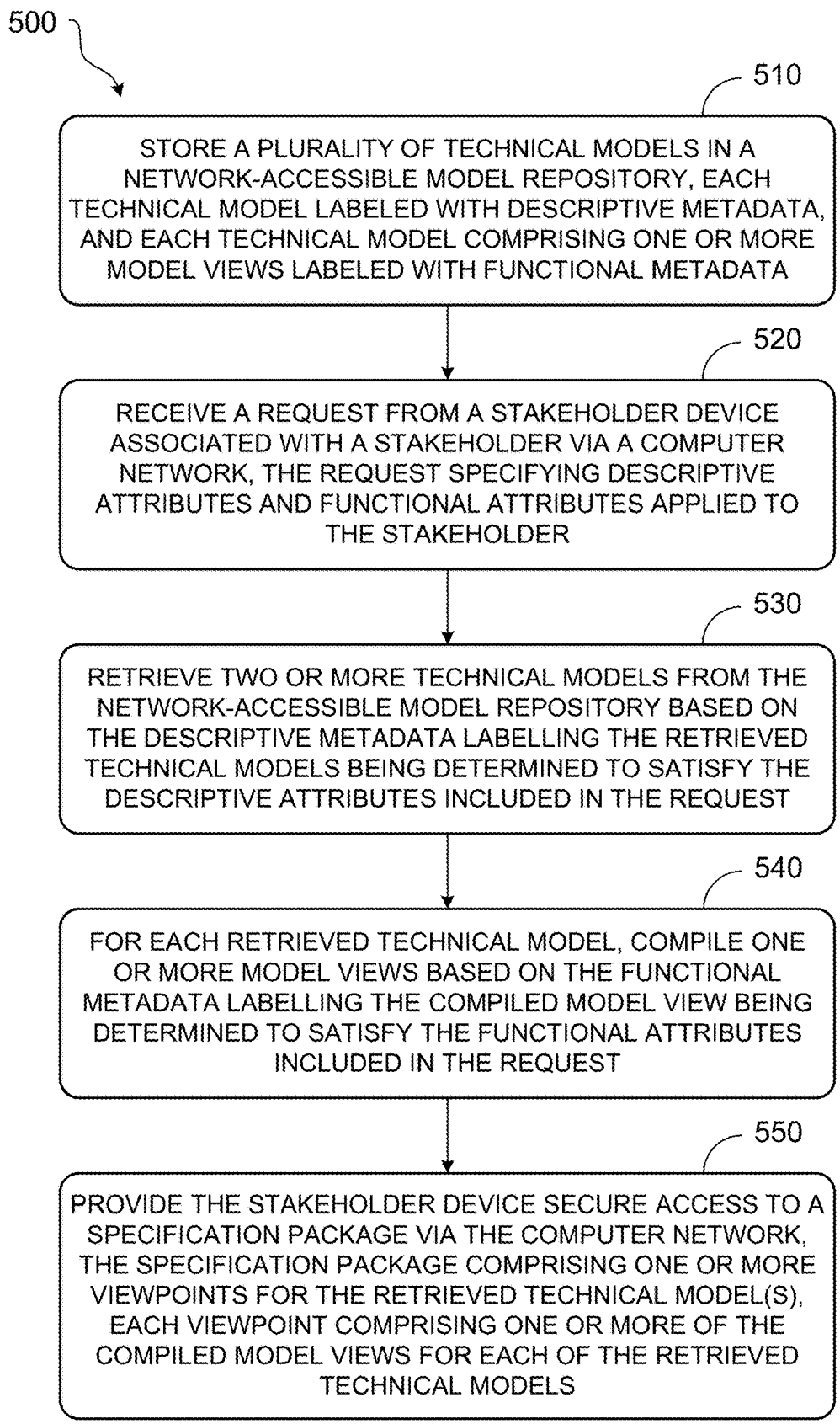
FIG. 5 is an example method for generating a specification package for a stakeholder based on metadata associated with a technical model.

Turning to FIG. 5, a method 500 is illustrated for generating a specification package for a stakeholder based on metadata associated with a technical model. Method 500 will be described with reference to FIGS. 1-4, but method 500 and similar methods can be implemented by any suitable system of one or more network-linked computing devices (e.g., computing system 700 of FIG. 7).

At 510, method 500 includes storing a plurality of technical models in a network-accessible model repository, each technical model labeled with descriptive metadata, and each technical model comprising one or more model views labeled with functional metadata.

At 520, method 500 includes receiving a request from a stakeholder device associated with a stakeholder via a computer network, the request specifying descriptive attributes and functional attributes applied to the stakeholder. The stakeholder request can be submitted via a stakeholder interface, as shown in FIGS. 1 and 4. In some examples, the stakeholder attributes can be stored at the stakeholder interface prior to the stakeholder submitting a request. The stakeholder request and/or attributes can be submitted via a stakeholder template, which, for example, can conform with metadata labeling technical models, such as a metadata manifest. In this way, the stakeholder attributes can be conveniently mapped to the technical model metadata.

At 530, method 500 includes retrieving one, two, or more technical models from the network-accessible model repository based on the descriptive metadata labelling the retrieved technical model being determined to satisfy the descriptive attributes included in the request. In this way, the stakeholder needs, purpose, and concerns can be mapped to specific models based on the stakeholder attributes and the model metadata. In some examples, the mapping can be performed as a 1:1 mapping between the descriptive metadata and the descriptive attributes. In some examples, only one technical model can be retrieved. When two or more technical models are retrieved, the models can be of different model types, and can be stored in different sub-repositories. Initially, all potentially applicable model formats can be identified for the stakeholder. For example, a procurement agent may not be interested in a code view of a mathematical analysis model, and such models may be dismissed. The technical model identifier can verify that the model purpose matches the stakeholder purpose. For example, for systems architects, all analysis models can be candidates but only ones with specific purposes, e.g. requirements DO331 model, can be retrieved. For more complex models (e.g. for sysML models), the mapping and finding process can be repeated at a model element level.

At 540, method 500 includes for each retrieved technical model, compiling one or more model views based on the functional metadata labelling the collected model view being determined to satisfy the functional attributes included in the request. In this way, the needs and purpose of the stakeholder/users are mapped to model views that are applicable. For example, the technical model manifest can be accessed to retrieve requirements allocated to a data artifact under consideration (e.g., a model), Then, the requirements can be displayed in a table and compared against the functional attributes for the stakeholder. In some examples, the model views can be generated previously and/or stored in the model repository, and can be retrieved e.g., via a link to the location of the view object. Additionally or alternatively, one or more model views can be automatically generated based on the functional attributes. This process can be based on information stored in the technical model metadata and/or API access to the technical model. In this way, each model view can correspond to the end user's required method, language, format, and presentation. Although "views" are primarily described herein with regard to models, other digital artifacts can also be parsed into views based on functional attributes of the appropriate stakeholders and end users.

At 550, method 500 includes providing the stakeholder secure access to a specification package via the computer network, the specification package including one or more viewpoints for the retrieved technical model(s), each viewpoint including one or more of the compiled model views for each of the retrieved technical models. In some examples, providing secure access to the specification package includes providing an encrypted specification package that is decryptable based on stakeholder credentials. Upon accessing the specification package the stakeholder and/or associated end users may visualize and/or interact with the compiled model views, use the model views to conduct simulations, compliance checks, and/or other tasks in developing, manufacturing, testing, and/or implementing tangible versions of the technical model(s).

In some examples, one or more viewpoints are generated prior to receiving the request from the stakeholder. Additionally or alternatively, one or more viewpoints can be generated based on the functional attributes. As described with regard to FIG. 3, each viewpoint can be a user-friendly aggregate of model views, digital artifact views, model diagrams, model screenshots, tables, model queries, webpages, text, and/or other data visualization artifacts. In some examples, the viewpoint can be compiled into a webapp or other interactive viewpoint that enhances the end user's visualization of the data.

In some examples, method 500 can additionally or alternatively include receiving an implementation package from the stakeholder via a stakeholder-associated device, the implementation package including one or more implementation models, each implementation model associated with descriptive metadata, and each implementation model including one or more implementation model views associated with functional metadata.

Method 500 can further include generating an implementation viewpoint including one or more implementation model views based on descriptive metadata for the implementation models and functional metadata for the implementation model views corresponding to a set of implementation attributes. The implementation attributes can include attributes belonging to one or more internal stakeholders, external stakeholders, etc.

As described with regard to FIG. 4A, each technical model within a larger system can be related to one or more other technical models and labeled as such within relationship metadata. For a stakeholder working with a first model, it may not be necessary to include applicable views for all related models within a specification package. However, an end user may encounter questions pertaining to the larger system while working with the first model. For example, questions may arise as to how changing a parameter of the first model impacts related models, or as to how resources for a neighboring subcomponent may be shared. As such, it may be of interest to the end user to have access to information about related models available on-demand. However, the end user may not desire to encounter all views of all related models within a viewpoint of the first model.

Figure 6:
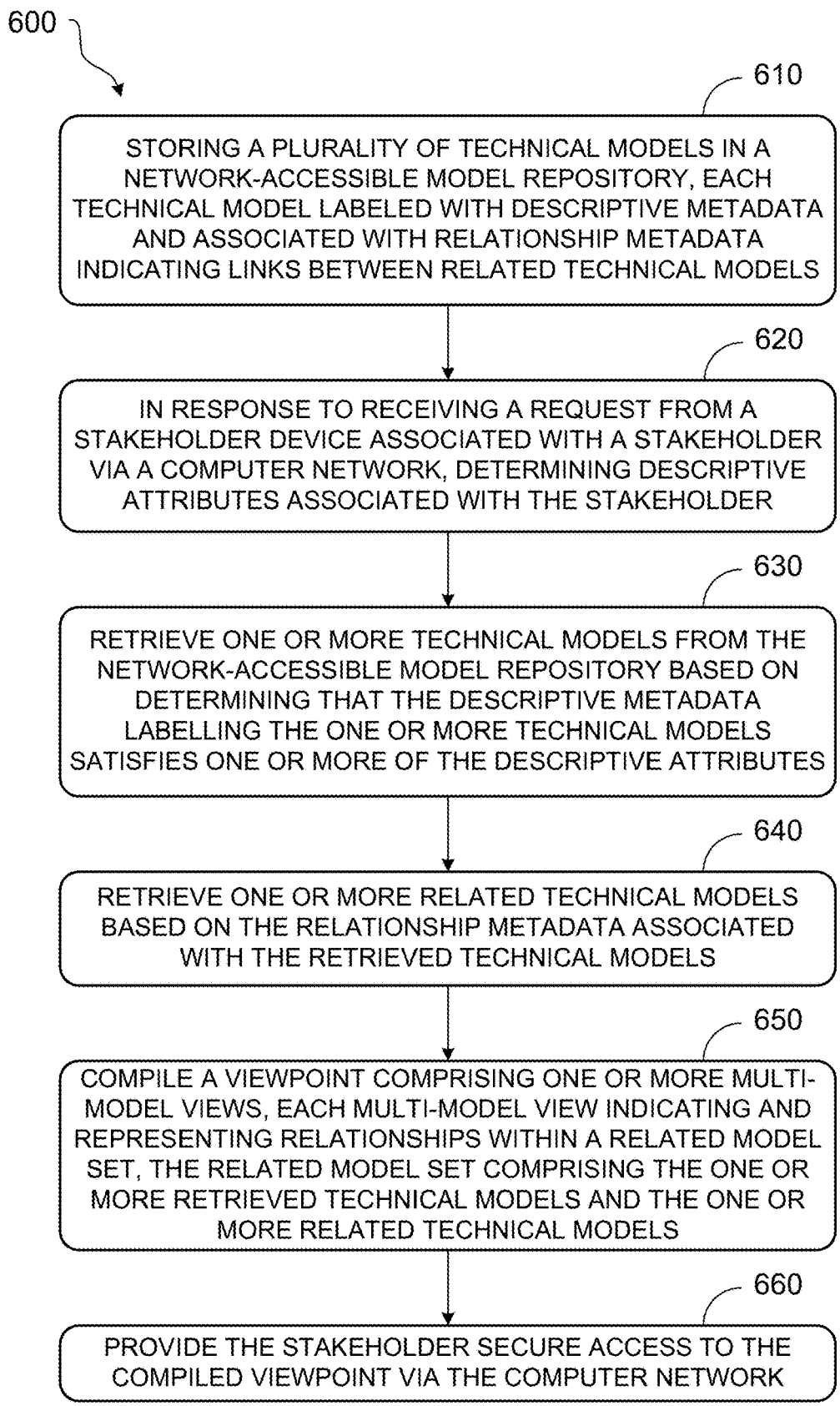
FIG. 6 is an example method for generating a viewpoint including a multi-model view based on metadata associated with two or more technical models.

FIG. 6 shows an example method 600 for generating a viewpoint including a multi-model view based on metadata associated with two or more technical models. Method 600 can be implemented by one or more computing systems, such as the system described with regard to FIGS. 4A and 4B and/or computing system 700 of FIG. 7.

At 610 method 600 includes storing a plurality of technical models in a network-accessible model repository, each technical model labeled with descriptive metadata and associated with relationship metadata indicating links between related technical models. In some examples, the technical models can be directly labeled with relationship metadata, such as in a manifest. In other examples, a table of relationship metadata for a plurality of models can be maintained in a model repository as part of a package manifest or package header. The links can indicate relationships between models, between model elements, and/or between a model and a model element. Links can indicate relationships between different model types.

At 620, method 600 includes, in response to receiving a request from a stakeholder device associated with a stakeholder via a computer network, determining descriptive attributes associated with the stakeholder. At 630, method 600 includes retrieving one or more technical models from the network-accessible model repository based on determining that the descriptive metadata labelling the technical model satisfies one or more of the descriptive attributes. Continuing at 640, method 600 includes retrieving one or more related technical models based on the relationship metadata associated with the retrieved technical models.

At 650, method 600 includes compiling a viewpoint including one or more multi-model views, each multi-model view indicating and representing relationships within a related model set, the related model set comprising the one or more retrieved technical models and the one or more related technical models. For example, related models and model components can be retrieved based on a data dependency analysis.

Once the applicable models and applicable views have been selected, their relationships can be presented and/or visualized in an end user friendly manner. Each viewpoint can include one or more multi-model views that includes a plurality of links within the related model set, such as a table of existing links between applicable digital artifacts. For example, ports that share the same input signal can be indicated. A link can be established between the behavioral model and the requirement model for one component. A link can be established between the geometry models and behavioral models for adjacent components.

In some examples, each viewpoint can include one or more multi-model views includes a plurality of link types within the related model set. As a non-limiting example, the viewpoint can include a multi-component interconnection model between the models included in the related model set. For example, the related models can be plotted on a canvas, and the shared interfaces can be queried based on the relationship metadata and the stakeholder attributes to generate a multi-component interconnection figure.

Continuing at 660, method 600 includes providing the stakeholder secure access to the compiled viewpoint via the computer network. Upon accessing the compiled viewpoint, the stakeholder and/or any associated end users may visualize relationships between models, simulate how changing specifications within one model impacts other, related models, explore additional relationships between models, etc.

By automatically compiling viewpoints, the disclosed systems and methods provide multiple benefits, particularly as an applied collaboration infrastructure for an OEM-supplier relationship. These systems and methods enable, streamlined collaboration, with faster access to applicable data on demand. This can lead to smoother, data interoperability with reduced waiting periods and/or collaboration intervals between the parties, ultimately reducing supplier cost assertions. By enabling directional transport of model-based packages, all parties can view data of interest in a time efficient manner, regardless of its origin, thus reducing labor costs. System access points can be secured and made to be compatible with IP protection and data access rights. Selected models and views can be secured and only accessed if the stakeholder can be verified as being allowed to consume them. Although well suited for use in a data exchange environment outside the company, this can also be used internally to facilitate the internal review process of Model-Based (Buy) Packages, by making sure the reviewers have access to the specific information and views needed to approve the package.

In some embodiments, the methods and processes described herein can be tied to a computing system of one or more computing devices. In particular, such methods and processes can be implemented as a computer-application program or service, an application-programming interface (API), a library, and/or other computer-program product.

Figure 7:
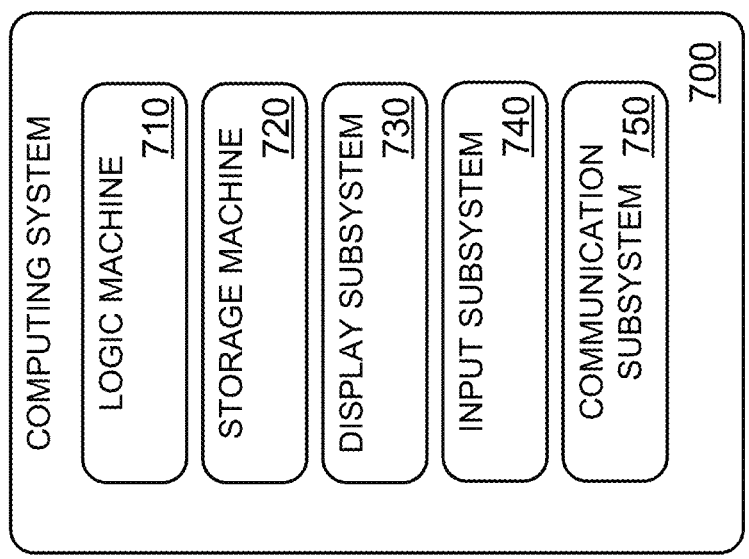
FIG. 7 schematically shows an example computing environment in which various embodiments can be implemented.

FIG. 7 schematically shows a non-limiting embodiment of a computing system 700 that can enact one or more of the methods and processes described above. Computing system 700 is shown in simplified form. Computing system 700 can take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 710 and a storage machine 720. Computing system 700 can optionally include a display subsystem 730, input subsystem 740, communication subsystem 750, and/or other components not shown in FIG. 7.

Logic machine 710 includes one or more physical devices configured to execute instructions. For example, the logic machine can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result.

The logic machine can include one or more processors configured to execute software instructions. Additionally or alternatively, the logic machine can include one or more hardware or firmware logic machines configured to execute hardware or firmware instructions. Processors of the logic machine can be single-core or multi-core, and the instructions executed thereon can be configured for sequential, parallel, and/or distributed processing. Individual components of the logic machine optionally can be distributed among two or more separate devices, which can be remotely located and/or configured for coordinated processing. Aspects of the logic machine can be virtualized and executed by remotely accessible, networked computing devices configured in a cloud-computing configuration.

Storage machine 720 includes one or more physical devices configured to hold instructions executable by the logic machine to implement the methods and processes described herein. When such methods and processes are implemented, the state of storage machine 720 can be transformed—e.g., to hold different data.

Storage machine 720 can include removable and/or built-in devices. Storage machine 720 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 720 can include volatile, nonvolatile, dynamic, static, read/write, read-only, random-access, sequential-access, location-addressable, file-addressable, and/or content-addressable devices.

It will be appreciated that storage machine 720 includes one or more physical devices. However, aspects of the instructions described herein alternatively can be propagated by a communication medium (e.g., an electromagnetic signal, an optical signal, etc.) that is not held by a physical device for a finite duration.

Aspects of logic machine 710 and storage machine 720 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of computing system 700 implemented to perform a particular function. In some cases, a module, program, or engine can be instantiated via logic machine 710 executing instructions held by storage machine 720. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

It will be appreciated that a "service", as used herein, is an application program executable across multiple user sessions. A service can be available to one or more system components, programs, and/or other services. In some implementations, a service can run on one or more server-computing devices.

When included, display subsystem 730 can be used to present a visual representation of data held by storage machine 720. This visual representation can take the form of a graphical user interface (GUI). As the herein described methods and processes change the data held by the storage machine, and thus transform the state of the storage machine, the state of display subsystem 730 can likewise be transformed to visually represent changes in the underlying data. Display subsystem 730 can include one or more display devices utilizing virtually any type of technology. Such display devices can be combined with logic machine 710 and/or storage machine 720 in a shared enclosure, or such display devices can be peripheral display devices.

When included, input subsystem 740 can comprise or interface with one or more user-input devices such as a keyboard, mouse, touch screen, or game controller. Such componentry can be integrated or peripheral, and the transduction and/or processing of input actions can be handled on- or off-board.

When included, communication subsystem 750 can be configured to communicatively couple computing system 700 with one or more other computing devices. Communication subsystem 750 can include wired and/or wireless communication devices compatible with one or more different communication protocols. As non-limiting examples, the communication subsystem can be configured for communication via a wireless telephone network, or a wired or wireless local- or wide-area network. In some embodiments, the communication subsystem can allow computing system 700 to send and/or receive messages to and/or from other devices via a network such as the Internet.

In one example, a method is presented, the method comprising storing a plurality of technical models in a network-accessible model repository, each technical model labeled with descriptive metadata, and each technical model comprising one or more model views labeled with functional metadata; receiving a request from a stakeholder device associated with a stakeholder via a computer network, the request specifying descriptive attributes and functional attributes applied to the stakeholder; retrieving two or more technical models from the network-accessible model repository based on the descriptive metadata labelling the retrieved technical models being determined to satisfy the descriptive attributes included in the request; for each retrieved technical model, compiling one or more model views based on the functional metadata labelling the compiled model view being determined to satisfy the functional attributes included in the request; and providing the stakeholder device secure access to a specification package via the computer network, the specification package comprising one or more viewpoints for the two or more retrieved technical models, each viewpoint comprising one or more of the compiled model views for each of the retrieved technical models. In such an example, or any other example, each technical model is additionally or alternatively labeled with descriptive metadata and functional metadata during authoring of the technical model. In any of the preceding examples, or any other example, the technical model is additionally or alternatively labeled with a model manifest comprising the descriptive metadata and the functional metadata. In any of the preceding examples, or any other example, the network-accessible model repository additionally or alternatively comprises two or more sub-repositories, each sub-repository configured to store technical models of a specific model type. In any of the preceding examples, or any other example, the one or more viewpoints additionally or alternatively comprise compiled model views derived from technical models of two or more specific model types. In any of the preceding examples, or any other example, providing secure access to the specification package additionally or alternatively comprises providing an encrypted specification package that is decryptable based on stakeholder credentials. In any of the preceding examples, or any other example, the one or more viewpoints are additionally or alternatively generated prior to receiving the request from the stakeholder. In any of the preceding examples, or any other example, one or more viewpoints are additionally or alternatively generated based on the functional attributes. In any of the preceding examples, or any other example, the method additionally or alternatively comprises receiving an implementation package from the stakeholder device, the implementation package comprising one or more implementation models, each implementation model associated with descriptive metadata, and each implementation model comprising one or more implementation model views associated with functional metadata; and generating an implementation viewpoint including one or more implementation model views based on descriptive metadata for the implementation models and functional metadata for the implementation model views corresponding to a set of implementation attributes. In any of the preceding examples, or any other example, the descriptive metadata additionally or alternatively comprises at least one or more of purpose metadata, content metadata, method metadata, or provenance metadata. In any of the preceding examples, or any other example, the functional metadata additionally or alternatively comprises at least one or more of purpose metadata, content metadata, method metadata, or provenance metadata.

In another example, a system comprises a secure, network-accessible model repository configured to store a plurality of technical models, each technical model labeled with descriptive metadata, and each technical model comprising one or more model views labeled with functional metadata; a stakeholder interface configured to receive a stakeholder request via a computer network, the stakeholder request comprising a plurality of descriptive attributes and functional attributes specific to a stakeholder, the descriptive attributes and the functional attributes corresponding to the descriptive metadata and functional metadata; a technical model identifier configured to map the descriptive attributes against the descriptive metadata, and to retrieve one or more technical models from the secure, network-accessible model repository based on the descriptive metadata labelling the technical model satisfying the descriptive attributes included in the stakeholder request; a view provider configured to, for each retrieved technical model, compile two or more model views based on the functional metadata labelling the compiled model view satisfying the functional attributes included in the stakeholder request; a viewpoint generator configured to compile one or more viewpoints for the one or more retrieved technical models, each viewpoint comprising two or more of the compiled model views for each of the retrieved technical models; and a specification package distributor configured to provide the stakeholder secure access, via the computer network, to a specification package comprising the one or more viewpoints for the one or more retrieved technical models. In such an example, or any other example, each technical model is additionally or alternatively labeled with the descriptive metadata and the functional metadata during authoring of the technical model. In any of the preceding examples, or any other example, the technical model is additionally or alternatively labeled with a model manifest comprising the descriptive metadata and the functional metadata. In any of the preceding examples, or any other example, the network-accessible model repository additionally or alternatively comprises two or more sub-repositories, each sub-repository configured to store technical models of a specific model type. In any of the preceding examples, or any other example, the one or more viewpoints additionally or alternatively comprise compiled model views derived from technical models of two or more specific model types.

In yet another example, a method comprises storing a plurality of technical models in a network-accessible model repository, each technical model labeled with descriptive metadata and associated with relationship metadata indicating links between related technical models; in response to receiving a request from a stakeholder device associated with a stakeholder via a computer network, determining descriptive attributes associated with the stakeholder; retrieving one or more technical models from the network-accessible model repository based on determining that the descriptive metadata labelling the one or more technical models satisfies one or more of the descriptive attributes; retrieving one or more related technical models based on the relationship metadata associated with the retrieved technical models; compiling a viewpoint comprising one or more multi-model views, each multi-model view indicating and representing relationships within a related model set, the related model set comprising the one or more retrieved technical models and the one or more related technical models; and providing the stakeholder secure access to the compiled viewpoint via the computer network. In such an example, or any other example, the viewpoint comprising the one or more multi-model views additionally or alternatively comprises a plurality of links within the related model set. In any of the preceding examples, or any other example, the one or more technical models are additionally or alternatively retrieved in part based on the relationship metadata. In any of the preceding examples, or any other example, the viewpoint comprising the one or more multi-model views additionally or alternatively comprises a multi-component interconnection model between the models included in the related model set.

To the extent that terms "includes," "including," "has," "contains," and variants thereof are used herein, such terms are intended to be inclusive in a manner similar to the term "comprises" as an open transition word without precluding any additional or other elements.

It will be understood that the configurations and/or techniques described herein are exemplary in nature, and that these specific examples are not to be considered in a limiting sense, because numerous variations are possible. The specific methods and operations described herein may represent one or more of any number of processing strategies. As such, various acts illustrated and/or described may be performed in the sequence illustrated and/or described, in other sequences, in parallel, or omitted. Likewise, the order of the above-described operations may be changed, depending on implementation. The subject matter of the subject disclosure includes all novel and non-obvious combinations and sub-combinations of the various configurations and techniques, and other features, functions, acts, and/or properties disclosed herein, as well as any and all equivalents thereof.

The invention claimed is:

1. A method, comprising:
storing a plurality of technical models in a network-accessible model repository, each technical model labeled with descriptive metadata, and each technical model comprising one or more model views labeled with functional metadata;
receiving a request from a stakeholder device associated with a stakeholder via a computer network, the request specifying descriptive attributes and functional attributes applied to the stakeholder;
retrieving two or more technical models from the network-accessible model repository based on the descriptive metadata labelling the retrieved technical models being determined to satisfy the descriptive attributes included in the request;
for each retrieved technical model, compiling one or more model views based on the functional metadata labelling the compiled model view being determined to satisfy the functional attributes included in the request; and providing the stakeholder device secure access to a specification package via the computer network, the specification package comprising one or more viewpoints for the two or more retrieved technical models, each viewpoint comprising one or more of the compiled model views for each of the retrieved technical models.

2. The method of claim 1, wherein each technical model is labeled with descriptive metadata and functional metadata during authoring of the technical model.

3. The method of claim 2, wherein the technical model is labeled with a model manifest comprising the descriptive metadata and the functional metadata.

4. The method of claim 1, wherein the network-accessible model repository comprises two or more sub-repositories, each sub-repository configured to store technical models of a specific model type.

5. The method of claim 4, wherein the one or more viewpoints comprise compiled model views derived from technical models of two or more specific model types.

6. The method of claim 1, wherein providing secure access to the specification package comprises providing an encrypted specification package that is decryptable based on stakeholder credentials.

7. The method of claim 1, wherein the one or more viewpoints are generated prior to receiving the request from the stakeholder.

8. The method of claim 1, wherein the one or more viewpoints are generated based on the functional attributes.

9. The method of claim 1, further comprising:

receiving an implementation package from the stakeholder device, the implementation package comprising one or more implementation models, each implementation model associated with descriptive metadata, and each implementation model comprising one or more implementation model views associated with functional metadata; and generating an implementation viewpoint comprising one or more implementation model views based on descriptive metadata for the implementation models and functional metadata for the implementation model views corresponding to a set of implementation attributes.

10. The method of claim 1, wherein the descriptive metadata comprises at least one or more of purpose metadata, content metadata, method metadata, or provenance metadata.

11. The method of claim 1, wherein the functional metadata comprises at least one or more of purpose metadata, content metadata, method metadata, or provenance metadata.

12. A system, comprising:

a secure, network-accessible model repository comprising at least a storage machine and a communication subsystem, the secure, network-accessible model repository configured to store a plurality of technical models, each technical model labeled with descriptive metadata, and each technical model comprising one or more model views labeled with functional metadata;

a stakeholder interface comprising at least an input subsystem and a communication subsystem, the stakeholder interface configured to receive a stakeholder request via a computer network, the stakeholder request comprising a plurality of descriptive attributes and functional attributes specific to a stakeholder, the descriptive attributes and the functional attributes corresponding to the descriptive metadata and functional metadata;

a technical model identifier comprising at least a processor, the technical model identifier configured to map the descriptive attributes against the descriptive metadata, and to retrieve one or more technical models from the secure, network-accessible model repository based on the descriptive metadata labelling the technical model satisfying the descriptive attributes included in the stakeholder request;

a view provider comprising at least a processor, the view provider configured to, for each retrieved technical model, compile two or more model views based on the functional metadata labelling the compiled model view satisfying the functional attributes included in the stakeholder request;

a viewpoint generator comprising at least a processor, the viewpoint generator configured to compile one or more viewpoints for the one or more retrieved technical models, each viewpoint comprising two or more of the compiled model views for each of the retrieved technical models; and a specification package distributor comprising at least a communication subsystem, the specification package distributor configured to provide the stakeholder secure access, via the computer network, to a specification package comprising the one or more viewpoints for the one or more retrieved technical models.

13. The system of claim 12, wherein each technical model is labeled with the descriptive metadata and the functional metadata during authoring of the technical model.

14. The system of claim 12, wherein the technical model is labeled with a model manifest comprising the descriptive metadata and the functional metadata.

15. The system of claim 12, wherein the network-accessible model repository comprises two or more sub-repositories, each sub-repository configured to store technical models of a specific model type.

16. The system of claim 15, wherein the one or more viewpoints comprise compiled model views derived from technical models of two or more specific model types.

17. A method, comprising:

storing a plurality of technical models in a network-accessible model repository, each technical model labeled with descriptive metadata and associated with relationship metadata indicating links between related technical models;

in response to receiving a request from a stakeholder device associated with a stakeholder via a computer network, determining descriptive attributes associated with the stakeholder;

retrieving one or more technical models from the network-accessible model repository based on determining that the descriptive metadata labelling the one or more technical models satisfies one or more of the descriptive attributes;

retrieving one or more related technical models based on the relationship metadata associated with the retrieved technical models;

compiling a viewpoint comprising one or more multi-model views, each multi-model view indicating and representing relationships within a related model set, the related model set comprising the one or more retrieved technical models and the one or more related technical models; and providing the stakeholder secure access to the compiled viewpoint via the computer network.

18. The method of claim 17, wherein the viewpoint comprising the one or more multi-model views comprises a plurality of links within the related model set.

19. The method of claim 18, wherein the one or more technical models are retrieved in part based on the relationship metadata.

20. The method of claim 17, wherein the viewpoint comprising the one or more multi-model views comprises a multi-component interconnection model between models included in the related model set.

* * * * *